Nov. 21, 1939.　　　E. W. PALMER ET AL　　　2,180,965
BOOK
Filed Nov. 4, 1938　　　2 Sheets-Sheet 1

INVENTORS
BY
ATTORNEYS

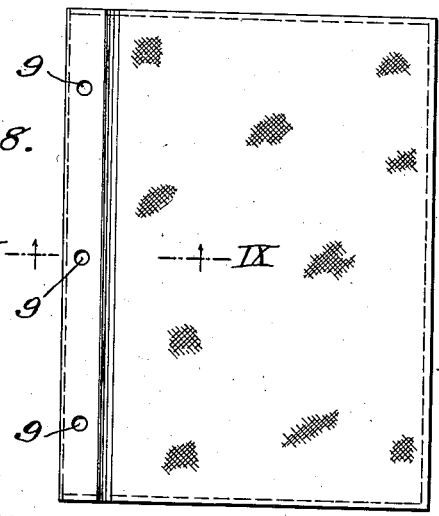
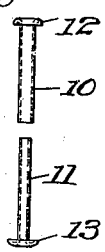
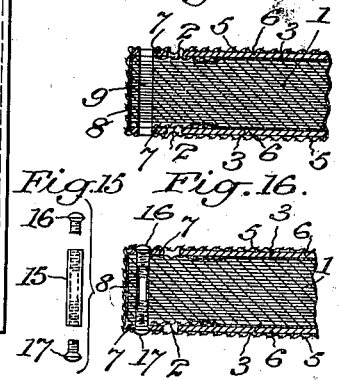
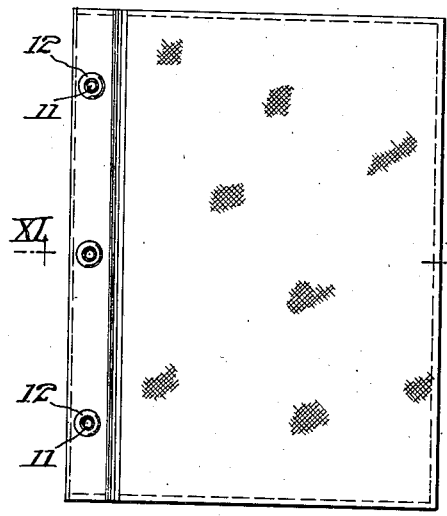
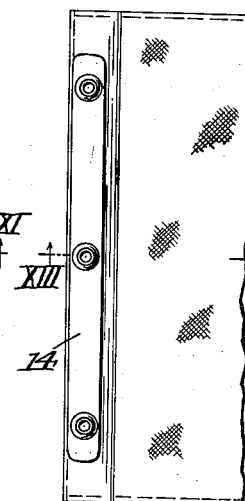
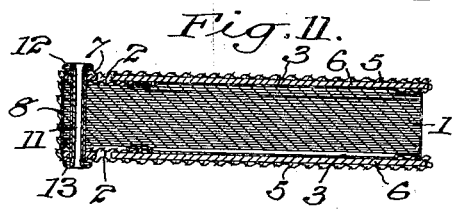
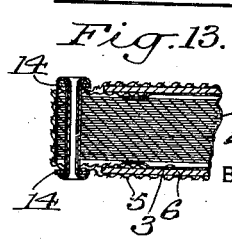

Patented Nov. 21, 1939

2,180,965

UNITED STATES PATENT OFFICE 2,180,965

BOOK

Elbridge W. Palmer and Herman L. Beutler, Kingsport, Tenn., assignors to Kingsport Press, Inc., Kingsport, Tenn., a corporation of Delaware Application November 4, 1938, Serial No. 238,778

5 Claims. (Cl. 281—21)

The object of our invention primarily is to produce a book in which the body of the book and the cover are so permanently bound together that greater flexibility, strength of binding, durability and useful life may be obtained.

Another object is to produce a practically indestructible book, especially for use as a school book, where great flexibility is obtained and where the cover cannot become loose nor the leaves of the book fall out.

Another object is to provide a binding which will be suitable for binding books of any size and bulk, the present binding eliminating the necessity for several heavily and expensive reinforced bindings on thick books with many inserts.

Practical embodiments of our invention are represented in the accompanying drawings:

Fig. 7 represents an end view of the book in its closed position before the binding posts are inserted for additionally securing the book body to the cover.

Fig. 8 represents a plan view of the same.

Fig. 9 represents a detail section taken in the plane of the line IX—IX of Fig. 8, looking in the direction of the arrows.

Fig. 10 represents a similar view after the binding posts have been fastened in position.

Fig. 11 represents a section taken in the plane of the line XI—XI of Fig. 10, looking in the direction of the arrows.

Fig. 12 represents a detail plan view showing a reinforcing strip located between the heads of the binding posts and the cover.

Fig. 13 represents a cross section taken in the plane of the line XIII—XIII of Fig. 12.

Fig. 14 represents a detail side view of one form of binding post comprising two hollow telescoping sections.

Fig. 15 represents a side view of another form of binding post comprising a flexible rubber tube and its screws.

Fig. 16 represents a detail cross section showing the application of the post to the book.

Fig. 17 represents a side view of still another form of binding post comprising a closely coiled spring and the headed screws for permanent engagement therewith.

Fig. 18 represents a detail section showing the application of the binding post illustrated in Fig. 17.

Fig. 19 represents a detail side view of still another form of binding post in which one head is riveted to the shank carrying the other head.

Fig. 20 represents a detail section showing the use of the binding post illustrated in Fig. 19.

Figure 1:
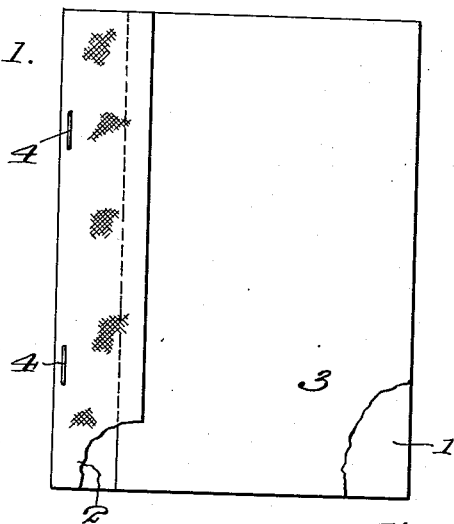
Fig. 1 represents a book body in which the inner and outer leaves and the hinge strips are permanently united in a usual manner.
Figure 2:
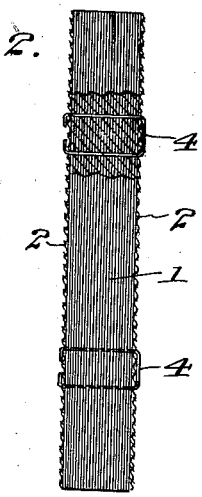
Fig. 2 represents a back edge view, partly in section, of the same.
Figure 3:
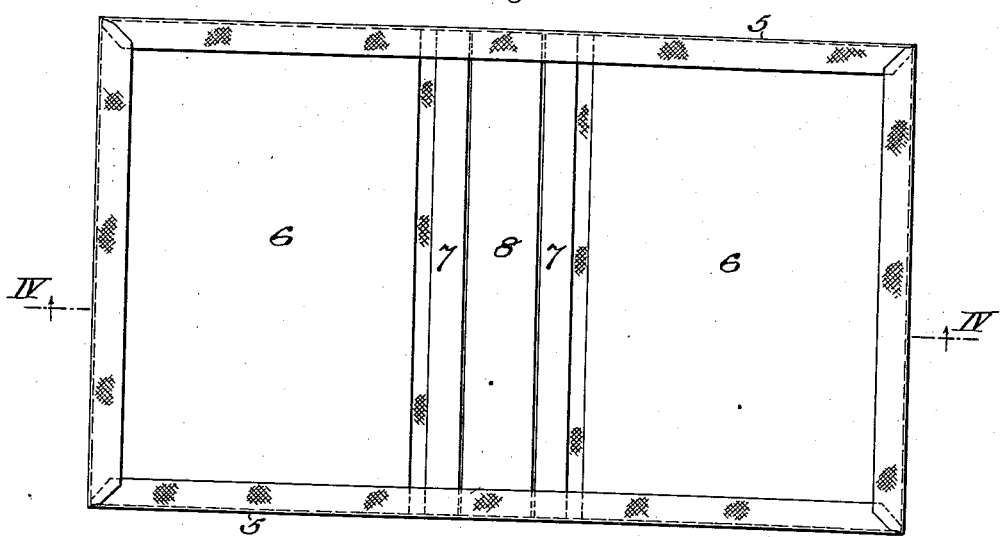
Fig. 3 represents an inside plan view of the cover in its laid-out or flat position, showing the relative positions of the side boards, side strips and back strip.
Figure 4:
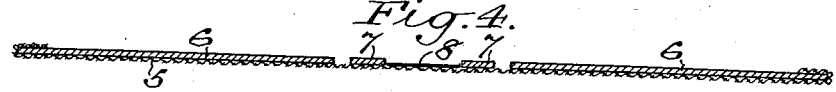
Fig. 4 represents a cross section taken in the plane of the line IV—IV of Fig. 3, looking in the direction of the arrows.
Figure 5:
Fig. 5 represents a similar section with the side strips in position to receive the book body.
Figure 6:
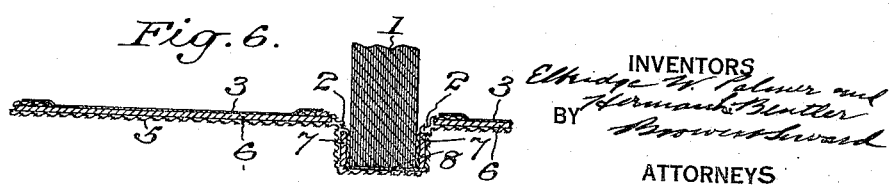
Fig. 6 represents a similar section with the book body adhered to the cover.

The book body herein illustrated comprises the inner leaves 1, the hinge strips 2 and the outer leaves 3. In this instance the leaves and hinge strips are permanently united by the side staples 4.

The book cover comprises the covering 5 of flexible material, the two side boards 6, the two side strips 7 and the back strip 8. These side boards, side strips and back strip are all adhered to the cover as by glue. It will be noted that the two side boards 6 and the two side strips 7 should be of some suitable stiff material, as cardboard, and that the side strips 7 are spaced sufficiently from the side boards 6 to permit the side boards to be folded entirely back from the body of the book without injury to the book. It will also be noted that the side strips 7 are sufficiently separated from the flexible back strip 8 to permit the side strips to occupy parallel positions at right angles to the back strip.

The method of permanently securing the book body to the cover is as follows:

The back edge of the book body is inserted between the side strips 7 and adhered to the back strip 8 of the cover. The hinge strips 2 are adhered to the side strips 7 and to the side boards 6 as well as to the outer leaves 3. These outer leaves 3 are adhered to the side boards 6 and to the overlapping edges of the covering 5.

A series of holes 9 are cut through the book cover and the book body at the side strips 7 and adjacent the back edge of the book body.

Binding posts are then passed through the holes 9 and serve to additionally secure the book body to the cover permanently at these points. These binding posts may be of various forms.

In the form illustrated in Fig. 14, the rigid binding post is shown as comprising telescoping hollow members 10 and 11 provided with heads 12 and 13 respectively. After the binding post has been inserted through its hole 9 the free end of the member 11 is spread to rivet the binding post permanently in its position for additionally securing the book body to the cover. If desired, binding strips 14 may be located between the heads 12 and 13 of the binding post and the cover for additionally stiffening the cover at this point.

In the form illustrated in Figs. 15 and 16, an interiorly screw-threaded flexible tubular member 15 is arranged to have headed screws 16 and 17 engaged with the opposite ends of the tubular member for permanently holding the binding post in its position to additionally secure the book body to the cover.

In the form illustrated in Figs. 17 and 18, a flexible tubular member 18 is formed of a closely coiled spring and headed screws 19 and 20 are engaged with the bore of the said spring to additionally secure the book body to the cover.

In the form illustrated in Figs. 19 and 20, the rigid member 21 is provided at one end with a head 22. A head 23 is provided for spreading the other end of the member 21 after the post has been inserted into its hole for riveting the post in position to additionally secure the book body to the cover.

It will thus be seen that we have provided either rigid or flexible binding posts for additionally securing the book body to the cover, it being understood that in all instances the binding post is permanently secured in its position.

From the above description it will be seen that we are enabled to utilize a book body built in a usual manner and permanently securing the book body to the cover in such a manner as to ensure the permanent attachment of the cover to the book body, the book body and cover themselves becoming a complete and integral unit.

It will also be seen that the length and diameter of the binding post may be varied to suit the size and bulk of the book and the number of binding posts required for each particular book.

It will also be seen that the binding post may be made to snugly fit within the holes cut through the cover and book body so as to eliminate all strain and pull on the cover or book body which would tend to distort or tear the book leaves.

It will also be seen that the covers may be folded fully back, away from the book body, a feature which is much to be desired, especially in school books which are subjected to rough usage.

It is evident that various changes may be resorted to in the construction, form and arrangement of the several parts without departing from the spirit and scope of our invention, and hence we do not intend to be limited to the particular embodiments herein shown and described, but

What we claim is:

1. In a book, a book body comprising permanently united inner leaves, hinge strips and outer leaves; and a book cover comprising a flexible covering, a back strip, two side boards and two side strips; said covering being adhered to the side boards, the side strips and the back strip; the back edge of the book body being adhered to the back strip; the hinge strips being adhered to the side strips and the side boards; and the outer leaves being adhered to the side boards; and posts passing through said cover and body for additionally binding them together.

2. In a book, a book body comprising permanently united inner leaves, hinge strips and outer leaves; and a book cover comprising a flexible covering, a back strip, two side boards and two side strips; said covering being adhered to the side boards, the side strips and the back strip; the back edge of the book body being adhered to the back strip; the hinge strips being adhered to the side strips and side boards; and the outer leaves being adhered to the side boards; said book cover and book body having a series of holes cut therethrough by the side strips; and posts passing through said holes for additionally binding the book cover and body together.

3. In a book, a book body comprising permanently united inner leaves, hinge strips and outer leaves; and a book cover comprising a flexible covering, a back strip, two side boards and two side strips; said covering being adhered to the side boards, the side strips and the back strip; the back edge of the book body being adhered to the back strip; the hinge strips being adhered to the side strips and side boards; and the outer leaves being adhered to the side boards; said book cover and book body having a series of holes cut therethrough, at the side strips; double headed posts passing through said holes for additionally binding the book cover and body together, and stiff reinforcing binding strips located between the heads of the posts and the cover.

4. In a book, a book body comprising permanently united inner leaves, hinge strips and outer leaves; and a book cover comprising a flexible covering, a back strip, two side boards and two side strips spaced from the side boards sufficiently to permit the side boards to be folded entirely back from the body of the book and sufficiently separated from the back strip to permit the side strips to occupy parallel positions at right angles to the back strip; said covering overlapping the side boards, side strips and back strip and adhered thereto; the back edge of the book body being adhered to the back strip; the hinge strips being adhered to the side strips and side boards; and the outer leaves being adhered to the side boards and overlapping edges of the covering; and posts passing through said cover and body for additionally binding them together.

5. In a book, a book body comprising permanently united inner leaves, hinge strips and outer leaves; and a book cover comprising a covering of flexible material, a back strip, two side boards and two side strips spaced from the side boards sufficiently to permit the side boards to be folded entirely back from the body of the book and sufficiently separated from the back strip to permit the side strips to occupy parallel positions at right angles to the back strip; said covering overlapping the side boards, side strips and back strip and adhered thereto; the back edge of the book body being adhered to the back strip; the hinge strips being adhered to the side strips and side boards; and the outer leaves being adhered to the side boards and overlapping edges of the covering; said book cover and book body having a series of holes cut therethrough at the side strips adjacent the back edge of the book body; and posts passing through said holes for additionally binding the book body and cover together.

ELBRIDGE W. PALMER.
HERMAN L. BEUTLER.